July 10, 1923.
C. McBRIDE
OVEN
Filed Jan. 23, 1922
1,461,280
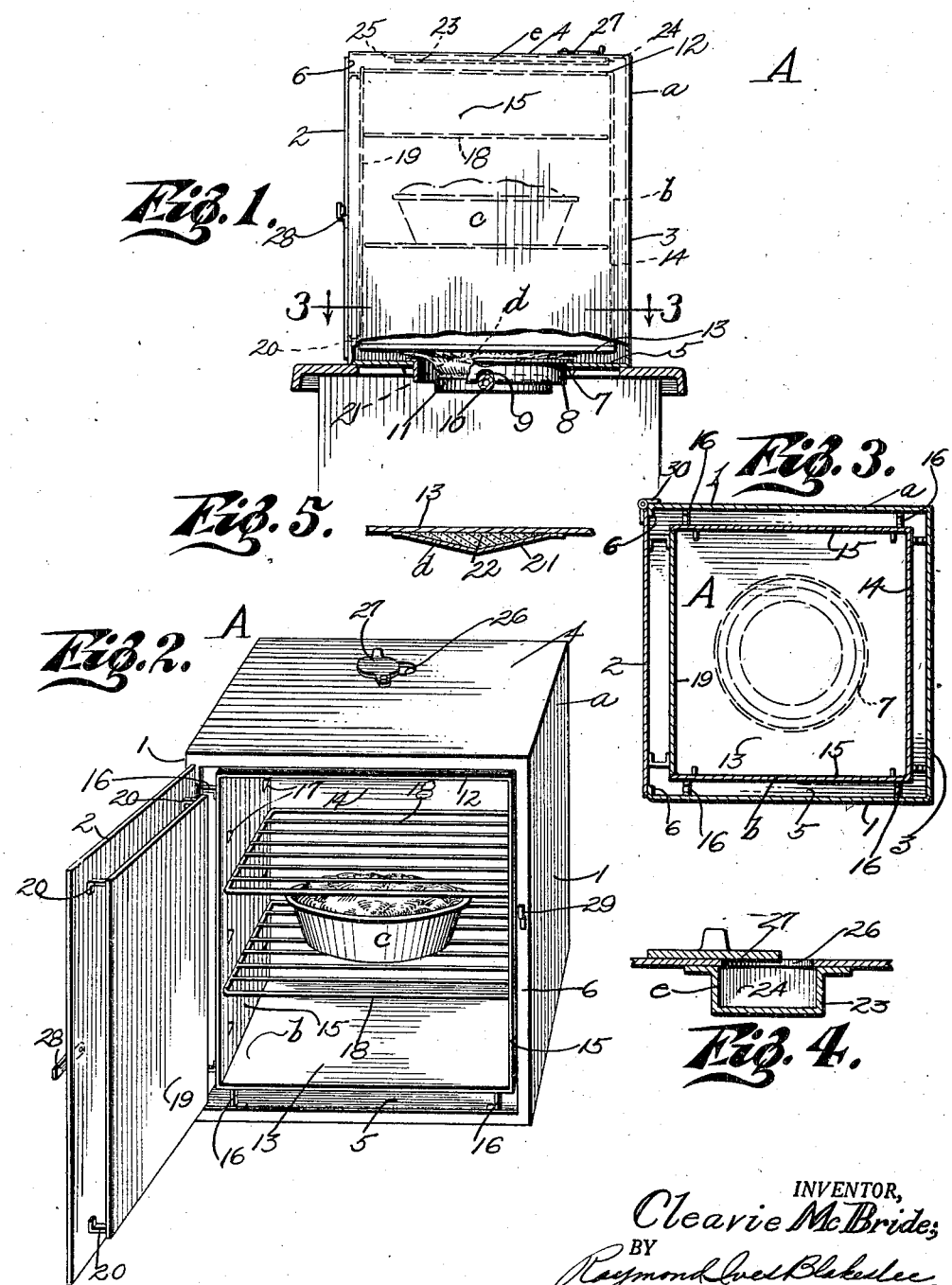
INVENTOR,
Clearie McBride;
BY
Raymond Oel Blakeslee,
ATTORNEY.

Patented July 10, 1923.

1,461,280

UNITED STATES PATENT OFFICE.

CLEAVIE McBRIDE, OF LOS ANGELES, CALIFORNIA.

OVEN.

Application filed January 23, 1922. Serial No. 531,184.

*To all whom it may concern:*

Be it known that I, CLEAVIE MCBRIDE, a citizen of the United States, residing at Los Angeles, in the county of Los Angeles and State of California, have invented new and useful Improvements in Ovens, of which the following is a specification.

This invention relates to ovens, and particularly to an oven which may be incorporated within a stove as a built-in feature or may act as an attachment for a stove to be placed over one of the burners. The oven may be used on any type of stove, such as a gas, electric, oil or otherwise.

The invention has for an object the provision of an oven which will securely cook any contents therein evenly and without scorching or burning the same. It is well known that the average oven in use today does not cook the contents within the same with any uniformity, certain parts being baked or cooked quite hard or scorched or burnt, while other parts are hardly cooked at all, and in the case of cake or bread it often happens that the center portion thereof is practically a dough. With my oven, however, the material within the oven is evenly baked.

In practicing the invention I provide an oven member which comprises an outer and an inner casing spaced from each other, with the outermost casing provided with an opening adapted to be placed over the burner of a stove. The inner casing is thoroughly insulated so that when any material to be cooked or baked is placed therein it is shut off from the space between the two casings in order that the gases of combustion shall not come in contact with the material within the inner casing. A suitable flue arrangement is provided so that the heated gases may escape from the space between the casings and a suitable door or damper member is provided to regulate the escape of said gases of combustion.

With the above named and other objects in view, the invention consists in the novel and useful provision, formation, interrelation and general arrangement of parts, members and features, all as shown in the accompanying drawing, described in the following detailed statement, and finally pointed out in claims.

In the drawing:

Figure 1 is a fragmentary view, certain parts being in section, of the improved oven, said oven being placed over a burner of a stove;

Figure 2 is a perspective view of the improved oven with the door member open and showing the general construction thereof;

Figure 3 is a cross sectional view of the oven, taken on the line 3—3 of Figure 1, and looking in the direction of the appended arrows;

Figure 4 is a fragmentary cross sectional view of the flue member for allowing the escape of the gases of combustion, and Fig. 5 is a fragmentary cross section of the bottom of the oven inner casing and the baffle plate secured to the under side of said bottom.

Corresponding parts in all the figures are designated by the same reference characters.

Referring with particularity to the drawing, the improved oven is designated in its entirety by A, and of which $a$ is the outer casing and $b$ the inner casing. The outer casing includes side wall members 1, and a door member 2, a back member 3, and top and base members 4 and 5. A flange 6 is provided at the front of the oven. The door member 2 engages the flange when the door is closed. The bottom 5 of the outer casing $a$ is provided with an enlarged opening 7 and an annular flange member 8 is received within said opening 7 with the flanged portion of said annular member engaging the walls of the bottom member 5 surrounding said opening. The said annular member 8 is cut away as shown at 9 to accommodate a pipe 10, which pipe may conduct fluid to be burned; the pipe 10 leading to a burner 11, which burner is confined within the annular space of the member 8. The general construction of the pipe 10 is not a feature of this invention.

The inner casing $b$ comprises top and bottom wall members 12 and 13 and a back wall member 14 and side wall members 15. These members 12, 13, 14 and 15 are held in spaced relation from the inner surface of the casing $a$, as by means of arms 16, which are joined to the respective members comprising the inner casing and to the members of the outer casing $a$. The inner casing is provided on its interior with a plurality of projections 17 and grate members 18 may be placed on said projections so as to provide a plurality of spaced shelves upon which shelves material such as that shown at $c$ is held for the purpose of baking the same. The door member 2 carries a plate member 19 which may be considered the front wall of the inner casing *b* and the said member 19 is held spaced from the door 2 as by means of brackets 20. Thus when the door is closed, as shown in Figures 1 and 3, the plate member 19 will be received between the walls 15 and the top and bottom walls 12 and 13. It will immediately be seen, therefore, that the inner casing is practically closed, so that the heated gases of combustion which encircles the inner space between the casings *a* and *b* is prevented from contacting with the substance to be baked *c*. Objection may be raised at this time to the fact that any steam arising from the substance *c* may cause an explosion. However, the fitting between the door and the remaining walls of the casing *b* is not so tight as to allow this to happen. The steam which is forced from the substance *c* to a certain extent will condense and be reabsorbed by the substance *c*. Thus, in place of having a dry baked substance, we have one in which the original moisture content is to an appreciable extent retained, thus enhancing the relative value of the food qualities and taste of the substance. This process is somewhat analogous to the well-known method of dehydrating vegetables in which it is necessary to prevent a case-hardening of the substance to be dehydrated, and also to cause what may be termed an osmosis in the substance. With this particular form of oven it will be obvious that the heat in the inner space between the casings *a* and *b* will heat the inner casing and in turn the substance *c* will be heated evenly as any gas, such as air, within the casing *b*, will conduct the heat more or less uniformly. To insure even heating of the casing *b*, a conical baffle plate *d* is provided which is attached inverted to the outer surface of the bottom member 13 of the casing *b*. This baffle plate is adapted to be directly over the burner 11. The baffle plate includes a convex member 21 which is attached to the bottom wall 13, as best shown in Figure 5, and between the member 21 and the wall 13 is an asbestos packing 22. Thus the flame striking the convex member 21 will be deflected and the heat directed into the inter-space between the two casings without an undue heating of the bottom wall 13. A flue member *e* is provided to allow escape of the gases of combustion from the inter-space between the casings, and said flue member includes a U-shaped plate 23 attached to the inner surface of the top wall 4 of the casing *a* and which U-shaped member is closed at one end, as 24, and open at the other end, as shown at 25. The top 4 is provided with an opening 26 leading to the interior of the flue *e*, and said opening may be closed by means of a gate or shutter 27.

It will thus be seen that the heat from the burner will pass through the inter-space between the casings and in order to escape must pass through the opening 25 of the flue and then pass through the opening 26, being regulated in its escape by means of the gate or shutter 27. This construction of necessity causes an even distribution of heat about the casing *b*. The door 2 is conveniently held in a locked position by means of a hinge bolt 28 which may engage the catch 29 on the flange 6. Quite obviously the door member may be swung downwardly in place of opening at the side, as shown in the figures. The door 2 is hinged as at 30 in the customary manner to the casing *a*.

It will thus be seen that I have provided an oven which is simple of construction and which provides for an even distribution of heat within the casing, which casing is adapted to contain some material to be cooked or baked.

It is obvious that many changes and modifications may be made in departure from the particular disclosure in adapting the invention to varying conditions of use and service, all of said changes being made, however, without departing from the true spirit of the invention and the scope of the appended claims.

Having thus disclosed my invention, I claim and desire to secure by Letters Patent:

1. An oven, including an outer and an inner casing held in spaced relation from each other, and a door member carrying a spaced plate member adapted to close the outer and the inner casings, said door member and plate forming a heat circulating space therebetween; the bottom wall of said outer casing being formed with an opening therein and there being an annular member extending through said opening; said annular member being adapted to be placed over a burner of a stove to confine the flame therein; there being a baffle plate member carried by the bottom wall of the inner casing and extending partly within the annular member, and there also being a flue member carried by the top wall of the outer casing for conducting the gases of combustion from the space between the outer and the inner casings; said flue member comprising a U-shaped member closed at one end, and the top member of the outer casing being provided with an opening in communication with said flue member.

2. An oven, including an outer and an inner casing held in spaced relation from each other, and a door member carrying a spaced plate member adapted to close the outer and the inner casings, said door member and plate forming a heat circulating space therebetween; the bottom wall of said outer casing being formed with an opening therein and an annular member extending through said opening; said annular member being adapted to be placed over a burner of a stove to confine the flame therein; there being a baffle plate member carried by the bottom wall of the inner casing and extending partly within the annular member, and there also being a flue member carried by the top wall of the outer casing for conducting the gases of combustion from the space between the outer and the inner casing; said flue member comprising a U-shaped member closed at one end; the top member of the outer casing being formed with an opening in communication with said flue member, and a gate member adapted to pass over the opening in the top member of the outer casing to regulate the escape of gases therethrough.

In testimony whereof, I have signed my name to this specification in the presence of two subscribing witnesses.

CLEAVIE McBRIDE.

Witnesses:
  I. SHUTT,
  J. CALVIN BROWN.